(12) United States Patent
Bates

(10) Patent No.: US 11,280,102 B2
(45) Date of Patent: Mar. 22, 2022

(54) AUTOMATED VEHICULAR PARKING APPARATUS WITH ELECTRIC VEHICLE CHARGING CAPABILITIES

(71) Applicant: Park Plus, Inc., Oakland, NJ (US)

(72) Inventor: Paul Richard Bates, Randolph, NJ (US)

(73) Assignee: Park Plus, Inc., Fairview, NJ (US)

( * ) Notice: Subject to any disclaimer, the term of this patent is extended or adjusted under 35 U.S.C. 154(b) by 0 days.

(21) Appl. No.: 17/086,978

(22) Filed: Nov. 2, 2020

(65) Prior Publication Data

US 2021/0131134 A1 May 6, 2021

Related U.S. Application Data

(60) Provisional application No. 62/928,602, filed on Oct. 31, 2019.

(51) Int. Cl.
| | |
|---|---|
| *E04H 6/22* | (2006.01) |
| *E04H 6/42* | (2006.01) |
| *B60L 53/34* | (2019.01) |
| *H01Q 1/32* | (2006.01) |
| *G06K 19/07* | (2006.01) |
| *H01Q 1/22* | (2006.01) |
| *B60L 53/66* | (2019.01) |

(52) U.S. Cl.
CPC ........... *E04H 6/22* (2013.01); *B60L 53/34* (2019.02); *B60L 53/66* (2019.02); *E04H 6/422* (2013.01); *G06K 19/0723* (2013.01); *H01Q 1/2208* (2013.01); *H01Q 1/3208* (2013.01)

(58) Field of Classification Search
CPC .......... B60L 53/67; B60L 53/34; B60L 53/14; B60L 53/30; B60L 53/12; B60L 53/665; B60L 53/66; E04H 6/424; E04H 6/422; E04H 6/22; E04H 6/12
See application file for complete search history.

(56) References Cited

U.S. PATENT DOCUMENTS

| | | | |
|---|---|---|---|
| 6,641,351 B2 * | 11/2003 | Payne | E04H 6/14 414/234 |
| 2011/0140658 A1 * | 6/2011 | Cutwater | B60L 53/35 320/109 |
| 2015/0167339 A1 * | 6/2015 | Wastel | E04H 6/22 414/239 |
| 2019/0202317 A1 * | 7/2019 | Hou | H02J 7/0045 |

* cited by examiner

*Primary Examiner* — Glenn F Myers
(74) *Attorney, Agent, or Firm* — Gerald E. Hespos; Matthew T. Hespos; Michael J. Porco

(57) ABSTRACT

A vehicular parking apparatus includes a frame defining horizontal rows and vertical columns of parking spaces. Subframes are configured to have a vehicle parked thereon and can move vertically in the columns. Platforms move horizontally in the rows and are configured to engage and move the subframes with the vehicles thereon. The subframes, the platforms and the frame provide electrical connections for charging parked electric vehicles.

9 Claims, 6 Drawing Sheets

AUTOMATED VEHICULAR PARKING APPARATUS WITH ELECTRIC VEHICLE CHARGING CAPABILITIES

This application claims priority on U.S. Provisional Application No. 62/928,602 filed on Oct. 31, 2019, the entire disclosure of which is incorporated herein by reference.

BACKGROUND OF THE INVENTION

1. Field of the Invention

The invention relates to an automated parking apparatus that enables electric vehicles to be charged while parked.

2. Description of the Related Art

Electric vehicles have become increasingly popular due to concerns about the environmental impact of vehicles that rely upon fossil fuels. Additionally, battery technology continues to improve rapidly. Furthermore, government agencies have implemented or are considering regulations that discourage the use of internal combustion engines and encourage the use of electric vehicles. The encouragements for using electric vehicles have included tax incentives for the purchase of an electric vehicle.

Many municipal parking lots and parking garages have parking spaces dedicated to electric vehicles and with a charging apparatus at the spaces so that the electric vehicle can be recharged while parked. Parking lots at rest stops along highways also generally have parking spaces dedicated to electric vehicles and with a charging apparatus at these dedicated spaces.

The space available for vehicular parking is at a premium in many densely populated urban areas. The space required for a vehicular parking facility is dictated partly by the space required for a typical vehicle driver to maneuver the vehicle to or from a parking spot or stall in the parking facility. Facilities must be designed to accommodate large vehicles, such as SUVs, and must recognize the range of skills of drivers.

Automated parking facilities generally enable more cars to be parked in a specified area, and therefore are being implemented more widely in densely populated urban areas. An automated parking facility typically is configured so that a driver leaves the vehicle at an ingress bay of the parking facility. An automated apparatus then moves the vehicle to a designated parking spot. The automated apparatus later retrieves the vehicle and returns the vehicle to the driver at an egress bay.

There are several broad categories of automated parking facilities have been available for many years.

A first category of automated parking facilities often is referred to as a rack and rail system and requires the vehicle to be stopped on a comb-like supporting surface in an ingress bay or loading platform of the parking facility. Each comb-like supporting surface has spaced apart horizontal bars that may be compared to the teeth of a comb. These bars support the wheels of the vehicle. A shuttle moves beneath the vehicle and has its own comb-like bars that move vertically up between the comb-like bars at the loading platform to engage the lower surfaces of the tires and to lift the vehicle up from the loading platform. The shuttle then moves the vehicle horizontally and/or vertically away from the loading platform and into a position aligned with a designated parking stall. A robotic dolly is supported on the shuttle and beneath the vehicle. The robotic dolly has its own comb-like bars that move vertically up between the comb-like bars of the shuttle, and in some systems, the dolly teeth can expand or retract. The dolly teeth align between the bars of the shuttle, lift up against the lower surface of the vehicle tires and lift the vehicle from the bars of the shuttle. The robotic dolly then moves the vehicle horizontally and linearly into the designated parking stall. The parking stall has its own arrays of stationary comb-like bars. The comb-like bars of the robotic dolly move above the spaces between the stationary comb-like bars at the parking stall, then move vertically down between the comb-like bars at the parking stall so that the vehicle tires become supported on the stationary comb-like bars of the parking stall. The comb-like bars of the robotic dolly continue down and/or retract inwardly to a position spaced from the stationary comb-like bars at the parking stall. The robotic dolly then returns to the shuttle. A system of this type is disclosed in U.S. Pat. No. 6,077,017, which is assigned to the assignee of the subject invention. The disclosure of U.S. Pat. No. 6,077,017 is incorporated herein by reference.

Another broad category of automated parking facilities often is referred to as a tray-based system. In these systems, the vehicle driver drives a vehicle into an ingress bay or loading platform and stops the vehicle at a specified position on a tray. The parking surface of the tray is supported by legs at a position elevated from the ground or floor. An automated guided vehicle (AGV) then maneuvers under the tray, lifts the tray and the vehicle and transports the tray and vehicle to a designated parking spot. The AGV can maneuver with precision, thereby saving considerable maneuvering space in the parking facility. The AGV deposits the tray and the parked vehicle at a designated parking space and then maneuvers to perform additional work moving other trays with or without vehicles thereon. The AGV will retrieve the tray and the vehicle when the vehicle owner is prepared to leave the parking facility. Systems of this type have become more feasible and versatile in recent years due to advances in software and guidance systems. An automated parking facility with trays and AGVs is disclosed in U.S. Pat. No. 10,273,704, which is assigned to the assignee of the subject invention. The disclosure of U.S. Pat. No. 10,273,704 is incorporated herein by reference.

The third broad category of automated parking facilities generally can be implemented in a smaller scale and for a smaller capital investment. These systems rely upon vertical and horizontal movements of vehicles and often are referred to as lift and slide systems or puzzle systems due to the resemblance of the parking apparatus to the well-known puzzles that move square tiles within a rectangular frame. A parking apparatus of this type has a rectangular frame-like structure that defines a rectangular array of potential parking spots. The apparatus includes one or more sub-frames that can move vertically in the frame of the structure between the various horizontal parking levels defined by the structure. The apparatus also includes horizontally movable platforms that can move horizontally within the structure. In practice, a driver drives the vehicle onto a vacant subframe and then exits the vehicle. The movable platform at a designated level then moves horizontally into a position above the subframe with the vehicle thereon. The subframe with the vehicle parked thereon then is elevated to a designated parking level. The movable platform engages the subframe and transports the subframe with the vehicle thereon horizontally to a designated space in the apparatus. Appropriate horizontal and vertical movements of the parked vehicle are carried out respectively by the movable platform and the subframe when the vehicle is to be retrieved.

A rack and rail automated parking facility and a tray-based automated parking facility can be designed to include dedicated spaces for electric vehicles with charging stations at those spaces. A lift and slide automated parking apparatus has possible parking locations in the open frame-like structure of the system, but does not have the clearly designated parking spaces in a structure, such as in a rack and rail parking facility or a tray-based parking facility. A lift and slide parking apparatus generally can be installed for a smaller capital outlay and in a smaller space. However, the known electric vehicle charging devices are less well suited for a lift and slide parking apparatus.

In view of the above, an object of the invention is to provide a lift and slide parking apparatus with capabilities for charging electric vehicles.

SUMMARY OF THE INVENTION

The invention relates to a lift and slide automated vehicular parking apparatus that is configured to permit electric vehicles to be charged while parked.

The apparatus includes a structure with a rectangular array of possible parking locations arranged to form vertical columns and horizontal rows.

Vertically movable sub-frames are provided in each column defined by the structure. Each subframe is configured to have the vehicle parked thereon. Elevating apparatus is provided at each column defined by the structure and is operative to lift the subframe and the vehicle thereon to a specified horizontal row defined by the structure.

Horizontally movable platforms are provided in each horizontal row defined by the structure. Each platform is moved horizontally to align with one of the columns defined by the structure and is configured to releasably engage a subframe that is moved to the level of the platform. The platform then can move horizontally in its respective row while transporting the subframe and the vehicle positioned on the subframe. Horizontal movement of the platform stops at the designated parking location.

Each subframe may have a socket or plug that can be engaged mechanically and electrically with a charging cable for an electric vehicle. Alternatively, each subframe may have a charging cable with a plug that can be engaged with the charging socket of the electric vehicle. Thus, an electric vehicle that is parked on the subframe can be connected to the charging socket by a charging cable that extends from the charging socket of the subframe to the charging socket of the electric vehicle. The connection of the charging cable to the socket of the subframe and the socket of the electric vehicle can be carried out by the vehicle owner or by staff of the parking facility. The driver of the vehicle then exits the parking facility.

A control unit of the lift and slide parking apparatus chooses a designated parking location for the vehicle. The movable platform at the horizontal level that includes the designated parking location moves into vertical alignment with the column that has the subframe and the vehicle parked thereon. The subframe with the vehicle thereon then is elevated into mechanical engagement with the movable platform. The subframe and the movable platform also include mating electrical connectors that electrically connect with one another substantially when the movable platform and the subframe engage mechanically with one another. This electrical engagement can be achieved with plug and socket arrangements provided on the movable platform and the subframe. Alternatively, the electrical engagement can be achieved by mating inductive units that align with one another.

The movable platform includes appropriate cable arrangements, tracks or busbars that provide electrical connection between the socket, plug or inductive charging unit on the movable platform and an external power supply. As a result, the electrical connection achieved by the plug and socket or the inductive charging units on the movable platform and the subframe place the charging circuitry of the lift and slide parking apparatus and the charging circuitry of the vehicle in electrical communication with the external power source for charging the vehicle while the vehicle is parked.

As noted above, a charging cable can be used to provide electrical connection between the charging socket on the subframe and the charging socket on the vehicle. However, other connections are possible. For example, some electric vehicles have an inductive charging capability. For these situations, and inductive charging station can be incorporated into the subframe at a position that will align with the inductive charging terminal of the vehicle.

DETAILED DESCRIPTION

Figure 1:
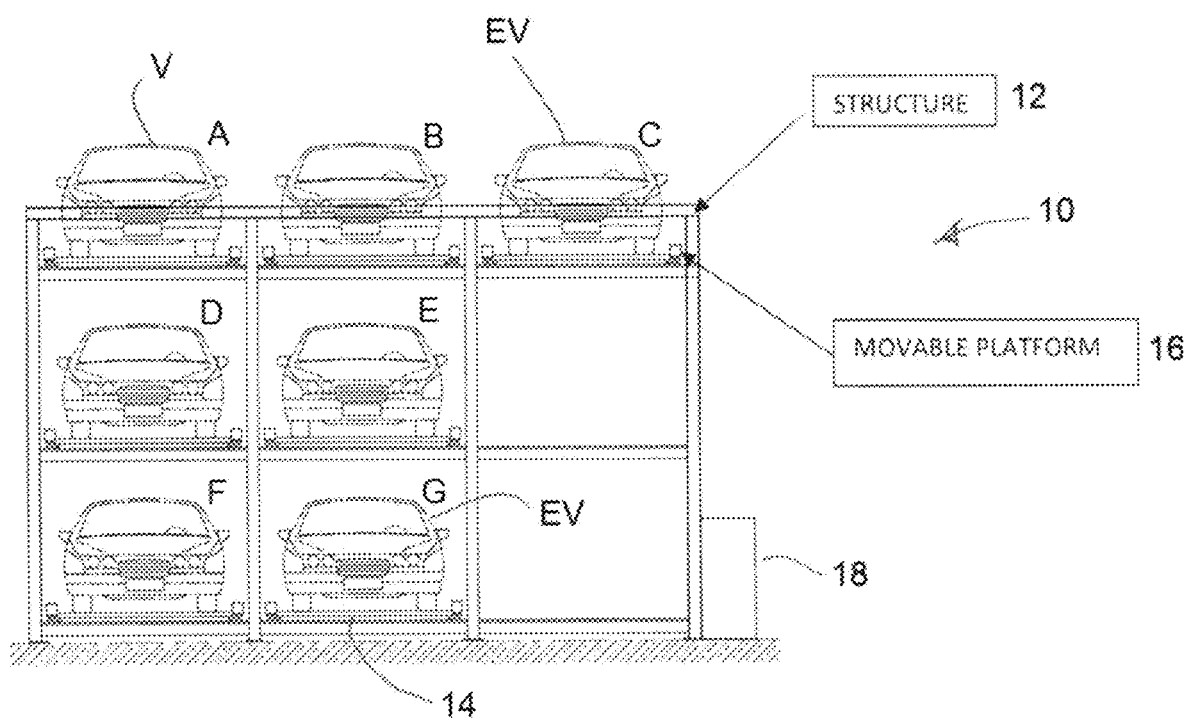
FIG. 1 is a front elevational view of a lift and slide parking apparatus that is configured to permit charging of parked electric vehicles.

A lift and slide automated vehicular parking apparatus in accordance with an embodiment of the invention is identified generally by the numeral 10 in FIG. 1. The apparatus has a generally rectangular frame-like structure 12 having a plurality of optional parking location A-G disposed in a rectangular array. The illustrated embodiment of the structure 12 has the optional parking locations disposed in three horizontal rows and three vertical columns. However, the number of rows and columns defined by the structure 12 can differ significantly from this illustrative embodiment. Furthermore, the number of rows need not equal the number of columns.

Figure 2:
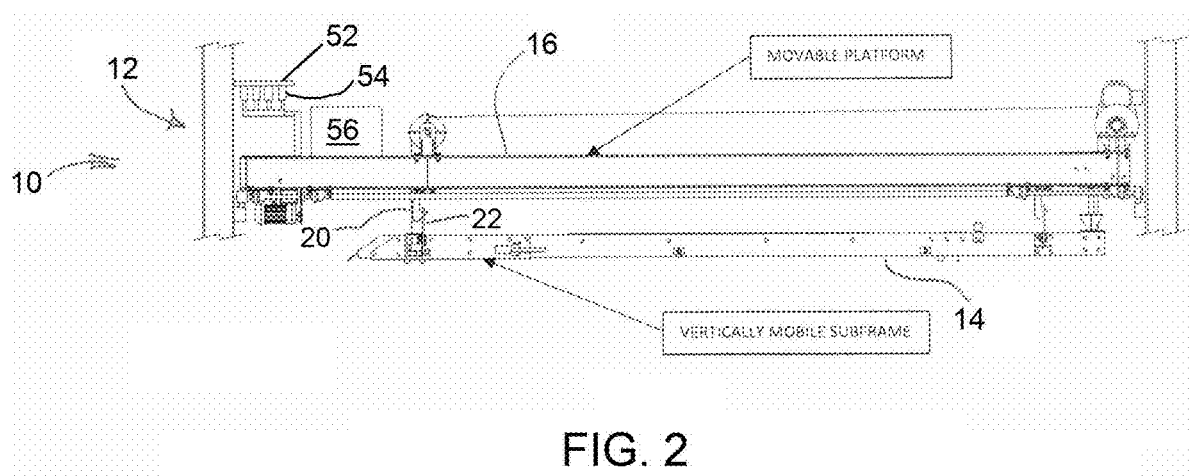
FIG. 2 is a side elevational view of a vertically movable subframe and a horizontally movable platform of the lift and slide parking apparatus illustrated in FIG. 1.

The apparatus 10 further includes vertically movable subframes 14 and horizontally movable platforms 16. Elevating mechanisms are associated with each vertical column defined by the structure 12 and are operated to lift the vertically movable subframes 14 within the respective column defined by the structure 12. Additionally, drive mechanisms are provided for moving the horizontally movable platforms 16 horizontally in the respective row of the structure 12. The vertical movements of the subframes 14 and the horizontal movements of the platforms 16 are controlled by a control unit 18. Hooks 20 extend down from the lower surface of each horizontally movable platform 16 and correspondingly configured brackets 22 project up from the upper surface of each vertically movable subframe 14, as shown in FIG. 2. In the typical operation, a vehicle V, such as an electric vehicle EV, will be driven onto a subframe 14. Simultaneously or shortly thereafter, the platform 16 will be moved horizontally into vertical alignment with the subframe 14 and the vehicle EV parked thereon. The apparatus 10 then will lift the subframe 14 with the vehicle EV thereon up toward the horizontally movable platform 16. Sufficient upward movement will cause the hooks 20 to engage the brackets 22 so that the subframe 14 and the vehicle EV parked thereon is suspended and supported by the horizontally movable platform 16. The apparatus 10 then moves the platform 16 horizontally along with the subframe 14 and the vehicle EV thereon to the designated parking location in the frame 12.

The apparatus 10 is configured to charge electric vehicles EV parked in the apparatus 10 by providing a first charging connection between the vehicle and the respective subframe 14, a second charging connection between the respective subframe 14 and the platform 16 and a third charging connection between the platform 14 and an external power source associated with the apparatus 10.

Figure 3:
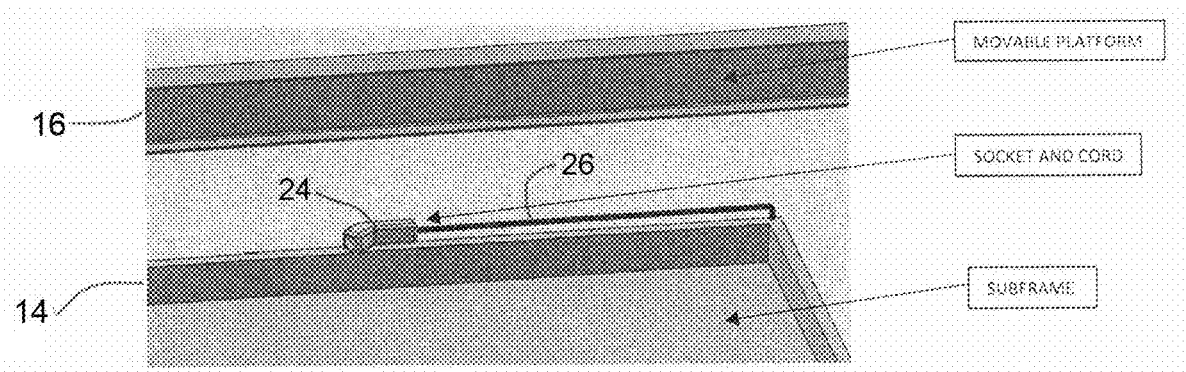
FIG. 3 is a perspective view showing a first optional arrangement for an electric charging connection between an electric vehicle and a vertically movable subframe where the connection uses a cable to connect a charging socket on a parked vehicle to the circuitry on the subframe.

The charging connection between the electric vehicle EV and the subframe 14 can be achieved by a plug 24 and cable 26 associated with the respective subframe 14, as illustrated in FIG. 3. The plug 24 is configured to mate with a corresponding charging socket in the electric vehicle EV, while the cable 26 is configured to deliver electric current to the plug 24. The end of the cable 26 opposite the plug 24 may have a second plug (not shown) that can be plugged into a corresponding socket associated with the vertically movable subframe 14. Alternatively, the cable 26 can have a more permanent electrical connection to circuitry provided on the vertically movable subframe 14. The subframe 14 can have appropriate mounting brackets to ensure that the plug 24 is positioned safely and conveniently when not in use.

Figure 4:
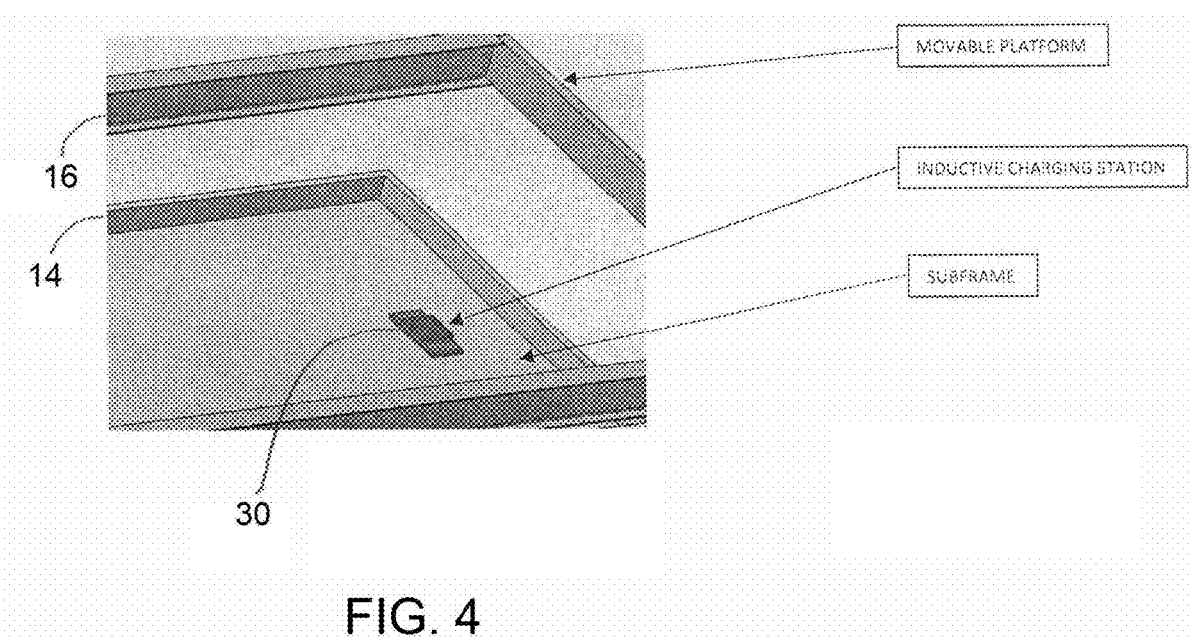
FIG. 4 is a perspective view of a second optional arrangement for an electric charging connection between an electric vehicle and a vertically movable subframe where the connection uses an inductive charging station on the subframe for cooperation with an inductive charging apparatus on a parked vehicle.

The charging connection between the electric vehicle EV and the vertically movable subframe 14 alternatively can be achieved by an inductive charging station 30 mounted to the subframe 14 at a position to align with a corresponding conductive charging apparatus on the electric vehicle EV, as illustrated in FIG. 4.

Figure 5:
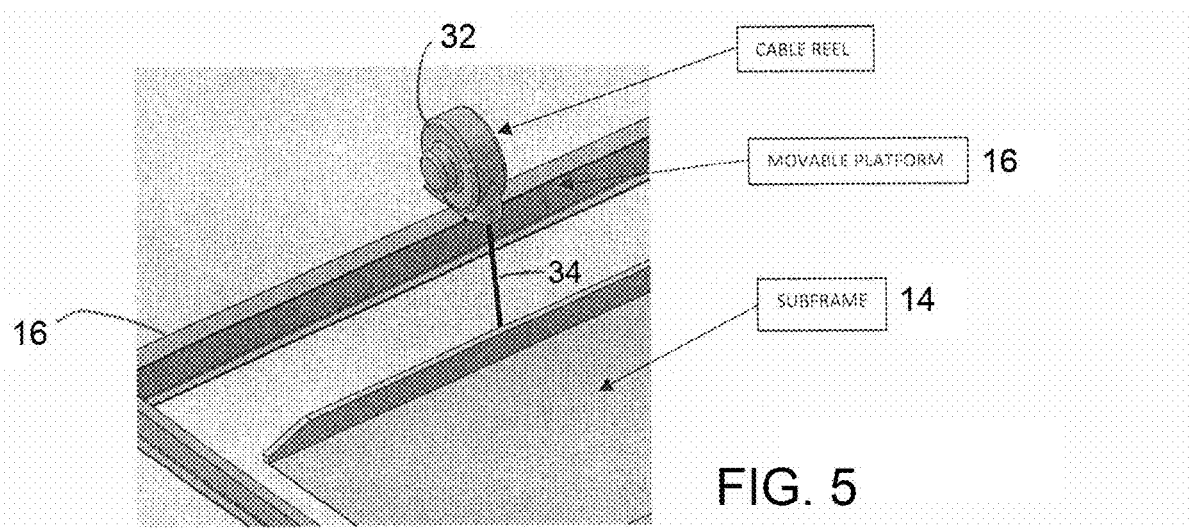
FIG. 5 is a perspective view showing a first optional embodiment with an electric cable connection between the movable platform and the subframe.

The charging connection between the vertically movable subframe 14 and the horizontally movable platform 16 can be achieved by a cable connection, as illustrated schematically in FIG. 5. In this regard, a reel or housing 32 can be provided on the horizontally movable platform 16 and can contain a cable 34 that is connectable to a corresponding connection on the subframe 14.

Figure 6:
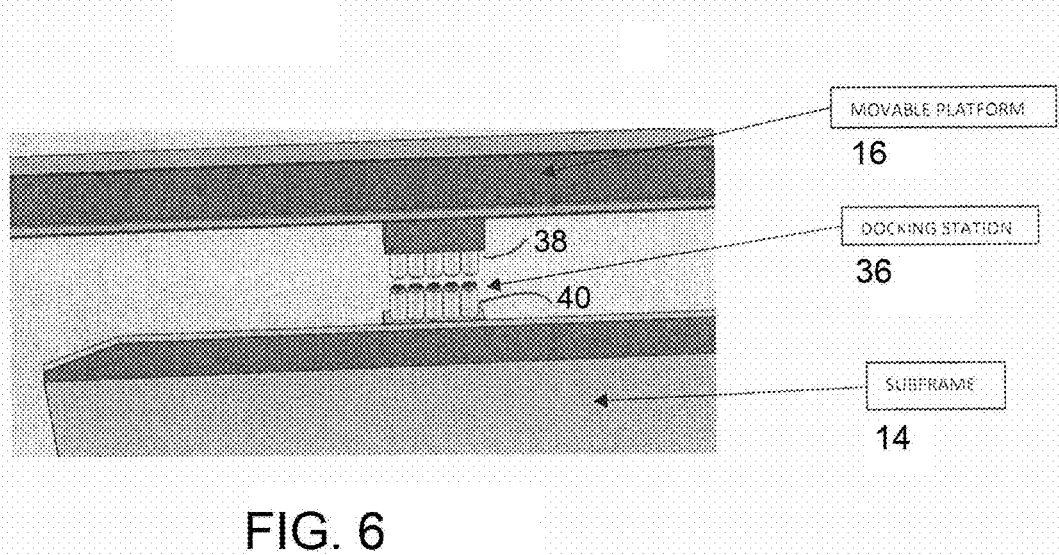
FIG. 6 is a perspective view showing a second optional embodiment with a mating docking stations for achieving electrical connection between the movable platform and the subframe.

As an alternative, a docking station 36 can be provided between the horizontally movable platform 16 and the vertically movable subframe 14, as illustrated in FIG. 6. In the illustrated embodiment, the docking station includes sockets 38 projecting down from a lower surface of the horizontally movable platform 16 and plugs 40 projecting up from the subframe 14. The horizontally movable platform 16 can be moved horizontally into a position aligned vertically with the subframe 14. The subframe 14 then is elevated toward the movable platform 16. The docking station 36 achieves electrical charging connection between the subframe 14 and the movable platform 16 at roughly the same time that the mechanical connection between the subframe and the movable platform is achieved due to the vertical lifting of the subframe 14 and the vehicle EV thereon toward the horizontally movable platform 16. Thus, in this embodiment the electrical charging connection between the subframe 14 and the horizontally movable platform 16 is achieved automatically as the subframe 14 and the vehicle EV are lifted.

A further alternate includes mating inductive units 48 and 50. The inductive unit 48 projects up from the subframe 14, while the inductive unit 50 projects down from the movable platform 16 at a position to align with the inductive unit 48. As in the previous embodiment relating to the docking station 36, the inductive units 48 and 50 align automatically upon lifting the vertically movable subframe 14 toward the horizontally movable platform 16.

Figure 7:
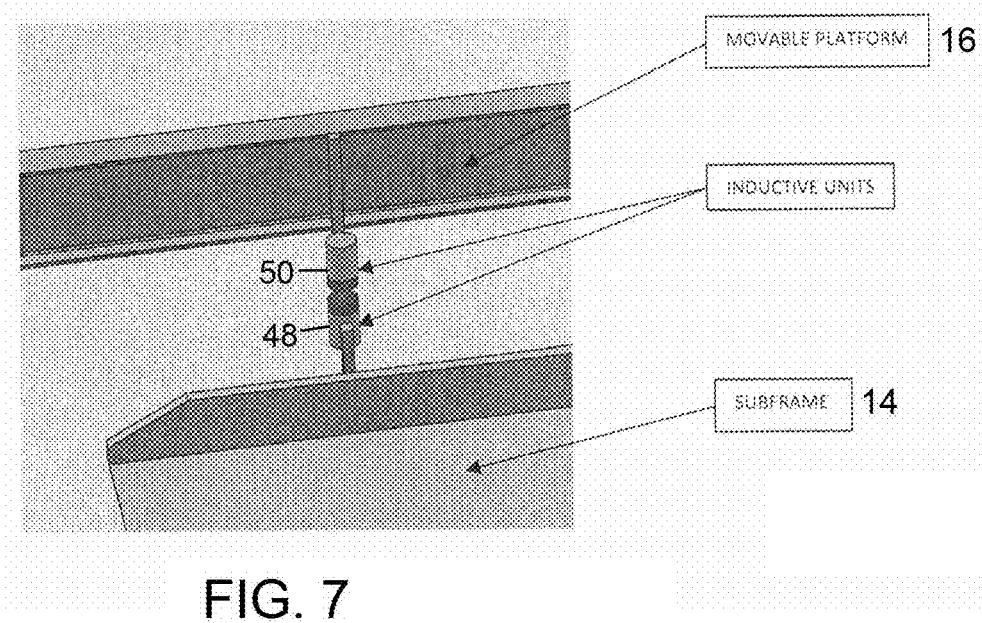
FIG. 7 is a perspective view showing third optional embodiment with an inductive electrical connection between the movable platform and the subframe.

As noted above, the movable platform 16 is operative to move horizontally at a particular level. Electrical charging current must be present in the movable platform for delivery to the subframe 14 and eventually to the electric vehicle EV. Frequent horizontal and vertical movements through the range of possible parking locations in the apparatus 10 could require complex mechanisms for delivering charging current from a stationary source near the apparatus 10 to the respective electric vehicle EV. However, maintaining an electrical connection through the range of horizontal movements carried out by the horizontally movable platform 16 can be achieved without complex mechanical and/or electrical connections. For example, coils, tracks and/or busbars can be provided for delivering the required charging current. In this regard, FIG. 2 illustrates a horizontally aligned busbar 52 supported, for example, on a rear part of the structure 12 to extend parallel to the horizontal moving direction of the movable platforms 16. Resilient contacts 54 are mounted on the horizontally movable platform 16 and are biased against the busbar 52 to achieve electrical contact as the horizontally movable platform 16 traverses horizontally across the structure 12. Each movable platform 16 also includes a platform-mounted control unit 56 for generating communication signals that will control the current flow between the external power source and the busbar 52 and ultimately to the resilient contacts 54 on each of the horizontally movable platforms 16. The control unit 56 also may communicate with the control unit 18 of the entire apparatus. The communications may be used to identify the actual location of the respective horizontally movable platforms 16 and the electric vehicle EV thereon. Communications to and from the control unit 56 also may control the horizontal movements of the platforms 16. These communications may be wired communications or wireless communications. Thus, the apparatus 10 disclosed herein achieves a first charging connection between the electric vehicle EV and the subframe 14, as shown for example in FIG. 3 or 4, a second charging connection between the subframe 14 and the movable platform 16, as shown for example in FIGS. 5-7, and a third connection via the bus bar 52 and the resilient contacts 54 for connecting the movable platform 16 to an external power source associated with the lift and slide apparatus 10.

Figure 8:
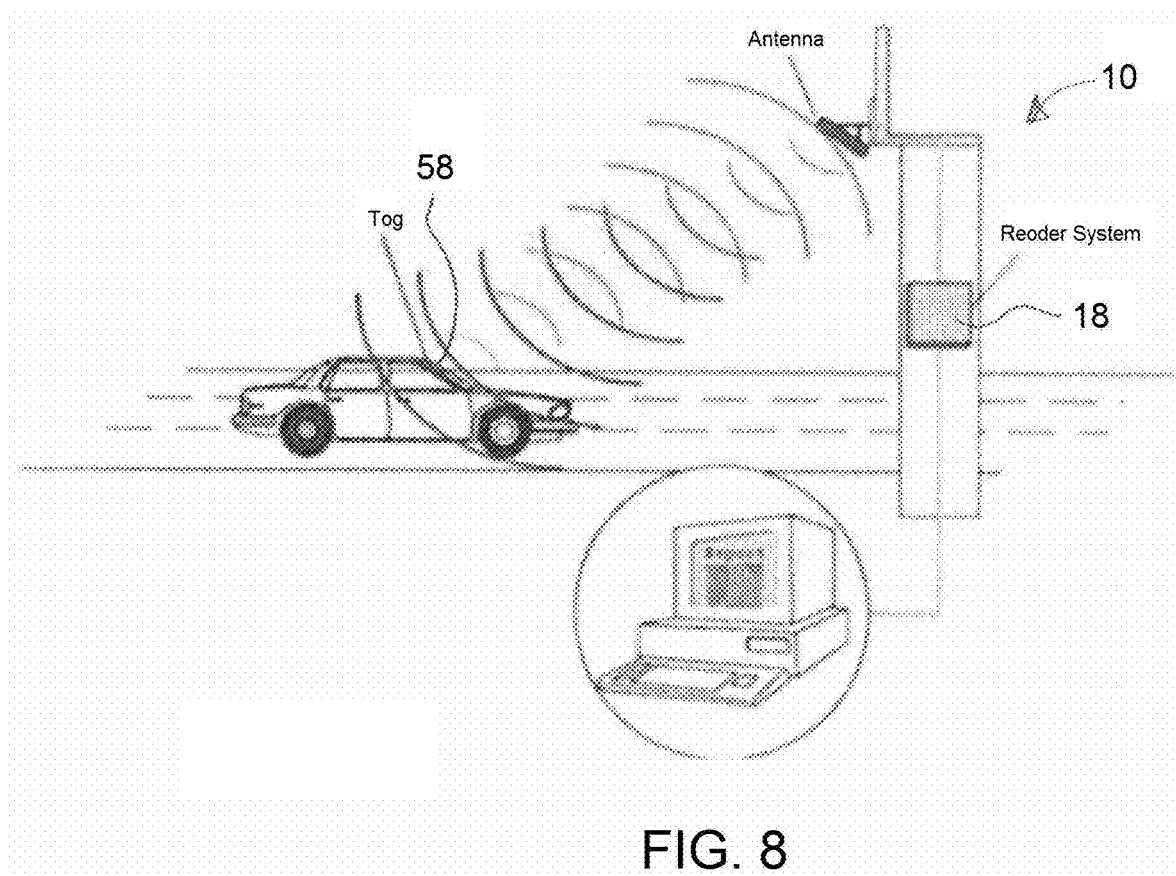
FIG. 8 is a schematic illustration of a communication system between the vehicle and the lift and slide parking apparatus.

The control unit 18 of the apparatus 10 also may communicate with a transponder or tag 58, such as an RFID tang, on the vehicle EV and/or with a personal communication device of the vehicle driver. In this regard, FIG. 8 schematically illustrates wireless communications between the vehicle EV and the apparatus 10, including the control unit 18 of the apparatus 10. These communications may be used to identify the vehicle EV based on a prior parking history and to assess the charging needs of the vehicle EV. The communications also may generate signals for moving the vertically movable subframes 14 and/or the horizontally movable platforms 16 into appropriate positions for receiving the approaching vehicle EV. Communications between a personal communication device of the vehicle owner and the control unit 18 of the apparatus 10 also can be used to move the vehicle into a position for departing from the apparatus 10 when a departure demand is generated by the personal communication device of the vehicle owner. Additionally, communication between the personal communication device of the vehicle operator and the control unit 18 of the apparatus 10 can be used to advise the vehicle operator of the current state of charge of the vehicle battery.

The invention has been described as if a charging capability is available at each of the optional parking locations provided by the apparatus 10. However, in certain embodiments, charging capability will be provided only at certain of the optional parking locations in the apparatus 10.

The lift and slide parking apparatus may have more or fewer possible parking locations, all or some of which may be configured to permit charging of electric vehicles. For example, only certain of the horizontal rows of parking locations can have the movable platforms connected to an external power source. Alternatively, only certain of the vertical columns of optional parking locations can be configured for connection to an external power source.

What is claimed is:

1. An apparatus for parking vehicles and charging electric vehicles that are among the vehicles that are parked, comprising: a support frame defining vertical columns and horizontal rows of parking spaces; sub-frames configured for having a vehicle parked thereon, the subframes being movable vertically in the vertical columns of the support frame; platforms movably horizontally in the horizontal rows of the support frame and into a position aligned with a selected one of the vertical columns, the platforms and the sub-frames having interengaging structures that engage so that a respective one of the platforms engages a corresponding one of the sub-frames and moves the subframe and the vehicle thereon horizontally to a selected one of the parking spaces; a first electrical connection between the electric vehicle and the subframe on which the electric vehicle is parked; a second electrical connection between the subframe and the platform engaged with the subframe and a third electrical connection between the platform and a power supply of the apparatus.

2. The apparatus of claim 1, wherein the first electrical connection comprises a cable extending between a charging socket on the electric vehicle and a socket on the respective subframe on which the electric vehicle is parked.

3. The apparatus of claim 1, wherein the first electrical connection comprises mating inductive coils on the electric vehicle and the subframe on which the electric vehicle is parked.

4. The apparatus of claim 1, wherein the second electrical connection comprises a socket projecting down from a lower surface of the platform and plugs projecting up from the subframe, the socket and the plugs being disposed to connect electrically when the subframe and the platform engage with one another.

5. The apparatus of claim 1, wherein the second electrical connection comprises inductive coils on the platform and the subframe at positions to align with one another when the platform and the subframe are engaged.

6. The apparatus of claim 1, wherein the third electrical connection comprises busbars aligned horizontally in each of the rows on the frame and resilient contacts on each of the platforms, the resilient contacts being engaged electrically with the horizontally aligned busbar in the respective row as in the platform moves horizontally in the respective row.

7. The apparatus of claim 1, further comprising an RFID antenna on the apparatus and an RFID tag on at least one of the vehicles, the RFID antenna receiving and transmitting information regarding the vehicle.

8. The apparatus of claim 7, wherein the RFID antenna and the RFID tag are configured to relay information relating to a parking space location of the vehicle.

9. The apparatus of claim 8, wherein the RFID antenna and the RFID tag are configured to relay information relating to a state of charge of the vehicle.

* * * * *